United States Patent
Narula et al.

(10) Patent No.: US 6,217,837 B1
(45) Date of Patent: Apr. 17, 2001

(54) USE OF SOL-GEL PROCESSED ALUMINA-BASED METAL OXIDES FOR ABSORBING NITROGEN OXIDES IN OXIDIZING EXHAUST GAS

(75) Inventors: Chaitanya Kumar Narula; Sabine Rita Nakouzi-Phillips, both of Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/184,146

(22) Filed: Nov. 2, 1998

(51) Int. Cl.⁷ .......................................................... B01J 8/02
(52) U.S. Cl. ................... 423/213.5; 423/212; 423/213.2; 423/239.1
(58) Field of Search ................................ 423/212, 213.5, 423/213.2, 239.1

(56) References Cited

U.S. PATENT DOCUMENTS

| 5,242,883 | * | 9/1993 | Ichikawa et al. ..................... 502/439 |
| 5,403,807 | | 4/1995 | Narula . | |
| 5,851,501 | * | 12/1998 | Krutzsch et al. ................ 423/213.2 |
| 5,874,057 | * | 2/1999 | Deeba et al. ...................... 423/239.1 |
| 5,922,293 | * | 7/1999 | Miyoshi et al. .................. 423/213.5 |
| 6,001,319 | * | 12/1999 | Yokoi et al. ...................... 423/239.1 |
| 6,010,673 | * | 1/2000 | Kanazawa et al. ............... 423/213.5 |

FOREIGN PATENT DOCUMENTS

| 93/03840 | | 3/1993 | (EP) . |
| 0 645 173 | * | 3/1995 | (EP) . |
| 0-645-173-A2 | | 3/1995 | (EP) . |
| 0 754 494 | * | 1/1997 | (EP) . |
| 0-778-072-A2 | | 6/1997 | (EP) . |
| 0-787-522-A2 | | 8/1997 | (EP) . |

* cited by examiner

Primary Examiner—Tom Dunn
(74) Attorney, Agent, or Firm—Lorraine S. Melotik

(57) ABSTRACT

This invention is a method for using alumina-based metal oxide materials made by sol-gel techniques for absorbing nitrogen oxides from lean-burn engines when the exhaust gas is oxidizing, the engines may be gasoline or diesel engines. The oxide materials include precious metal like platinum. The nitrogen oxides are desorbed when the exhaust is made richer and is reduced over the precious metal with reductants in the gas like hydrocarbons. Preferably, the alumina-based metal oxide is made from certain heterometallic alkoxides which include alkali metals or alkaline earth metals or both, and also aluminum. Optionally, the preferred materials may also include oxides of lanthanides.

9 Claims, 2 Drawing Sheets

USE OF SOL-GEL PROCESSED ALUMINA-BASED METAL OXIDES FOR ABSORBING NITROGEN OXIDES IN OXIDIZING EXHAUST GAS

Reference is made to related application Ser. No. 09/184,269 U.S. Pat. No. 6,153,555 entitled "Single Phase Metal-Alumina Materials Including Alkali Metals Made From Hetero-metallic Alkoxides".

FIELD OF THE INVENTION

This invention is related to the use of sol-gel manufactured alumina-based metal oxides materials with precious metal for absorbing nitrogen oxides from an oxidizing engine exhaust gas as during lean-burn engine operation. More particularly, the alumina-based material includes at least one of alkali metal or alkaline earth metal, and optionally a lanthanide metal. Preferably, the alumina-based metal oxide material is a single phase metal-alumina material made from particular hetero-metallic alkoxides.

BACKGROUND OF THE INVENTION

A recent approach for gasoline engines is to operate them in a lean-burn mode, where the A/F ratio is higher than stoichiometry, in order to improve fuel economy. Traditional three-way catalysts for treating engine exhaust gases operate efficiently to convert nitrogen oxides (NOx), carbon monoxide and hydrocarbons under stoichiometric conditions but are not efficient to convert the NOx in lean-burn situations. Lean-NOx catalysts formulated to convert NOx in an oxidizing exhaust are generally based on zeolites and convert the NOx by using reducing agents like hydrocarbons and carbon monoxide in the exhaust gas. They suffer from lack of good high temperature hydrothermal durability, that is, at high temperatures the structure of the zeolite collapses and dealumination occurs. Another approach for lean-burn exhaust gas treatment has focused on the use of lean-burn NOx traps, i.e., materials which are able to absorb nitrogen oxides from the exhaust gas during lean-burn operation and then later release them when the oxygen concentration in the exhaust gas is reduced. For example, when the A/F ratio is made rich or stoichiometric. Conventional NOx absorbents are alkaline earth metals like barium with a precious metal catalyst like platinum carried on alumina. The widely held mechanism for this absorption phenomena is that during lean-burn operation the platinum first oxidizes NO to $NO_2$ and the $NO_2$ subsequently forms a nitrate complex with the trapping material, e.g., the barium. In the regeneration mode, under a stoichiometric or rich environment, the nitrate decomposes and the NOx released is reduced catalytically over the platinum with reducing species like HC or CO in the exhaust gas.

One serious deficiency of such conventional absorbent materials is that the barium reacts with sulfur oxides generally present in exhaust gas to form barium sulfate. This inactivates the barium for NOx absorption. It is suggested that to decompose the barium sulfate it should be subjected to elevated temperatures of at least 600° C. or more in reducing gas conditions. One negative aspect of this regeneration process is that it leads to detrimental changes in the NOx absorbent such as reduced surface area and crystallization of the aluminate phases thereby reducing the efficiency of the NOx absorbent. Alkali metals like potassium have also been suggested as NOx absorbents, however, they are even more easily deactivated by sulfur than alkaline earth metals like barium. Repeated regeneration of the absorbent by heating, as discussed above, contributes to a loss of surface area in the alumina support material and contributes toward further sintering in the platinum precious metal responsible for the conversion of NOx to $NO_2$. Precious metal sintering results in a decrease in the active sites that convert NOx to $NO_2$, and hence a decrease in the total amount of NOx trapped on the available absorbent.

It would be desirable if a NOx absorbent could be found which would be more resistant to sulfur poisoning while being a good NOx absorbent. It would also be very desirable if the improved material could withstand repeated heating to de-sulfur, i.e., reactivate the absorbent, without significantly reducing the amount of surface area.

Sol-gel processing allows for the low temperature preparation of aluminum oxide materials of high purity and controlled microstructure. These materials can be in such forms as gels, aerogels and xerogels. Sol-gel processes have been found useful in preparing supported and unsupported inorganic membranes for chemical sensor and separation applications, for automobile catalyst washcoats, and for optical coatings for automotive glass. For example, in U.S. Pat. No. 5,403,807 by Narula, a method is disclosed for making a single phase metal-alumina sol-gel material which includes alkaline earth metal and optionally lanthanides. These materials are disclosed as being stable at high temperatures making them ideally useful as catalyst supports.

We have now unexpectedly found that alumina matrix materials including alkali metals and/or alkaline earths and optionally lanthanides when made by sol-gel techniques are excellent materials for use as NOx absorbents. These materials overcome the deficiencies of prior art NOx absorbents.

In U.S. application Ser. No. 09/134992 filed Aug. 17, 1998 U.S. Pat. No. 6,129,898 and entitled "NOx Trap Catalyst For Lean Burn Engines" commonly assigned with the present invention, a sol-gel oxide material is disclosed useful for NOx absorption. It comprises oxides of aluminum, magnesium and zirconium.

SUMMARY OF THE INVENTION

A method for treating exhaust gas containing carbon monoxide, hydrocarbons, and nitrogen oxides generated by a lean-burn internal combustion engine, the method comprising the step of: bringing the exhaust gas from said lean-burn engine in contact with an alumina-based metal oxide material made by sol-gel techniques preferably from alkoxides of the metals, and further includes at least 0.1 wt. % precious metal selected from the group consisting of platinum, palladium, rhodium, and a mixture of any of them. The alumina-based metal oxide material is an oxide based on metals consisting essentially of: (I) aluminum, (II) at least one of: (a) alkali metals, (b)alkaline earth metals, or (c) a mixture of them, and, optionally, (III) a lanthanide metal. Under lean-burn conditions, where the exhaust gas contains more oxygen than is required for oxidizing components to be oxidized in the exhaust gas, nitrogen oxides are absorbed on the metal oxide material and when the oxygen concentration in said gas is lowered the absorbed nitrogen oxides are desorbed from the metal oxide and reduced over the precious metal.

The preferred alumina-based metal oxide for use in the present invention method are (a) single phase alkali metal-aluminum-oxide materials, (b) single phase alkaline earth-metal aluminum oxide materials, or (c) single phase alkali metal-alkaline earth metal-aluminum oxide materials, any of which optionally may also include another metal, a lanthanide, al of these materials will herein be collectively referred to as single phase metal-alumina materials. These materials are made from alkoxides including certain heterometallic alkoxides which will be discussed in detail below. The ratio of alkali metals, alkaline earth metals, and/or lanthanide to alumina in these single phase metal-alumina materials can be changed by including varying amounts of, e.g., aluminum alkoxide, alkaline earth alkoxides, alkali metal alkoxides, or lanthanide alkoxides, with the heterometallic alkoxide during sol-gel processing thereof. The materials are useful as catalyst supports, e.g., loaded with precious metals like platinum.

DETAILED DESCRIPTION OF PREFERRED EMBODIMENTS

Figure 1:
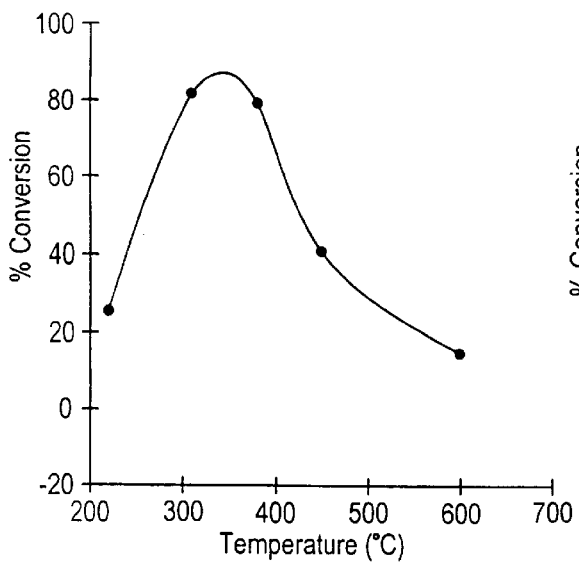
FIG. 1 is a graph showing the lean NOx trapping efficiency of an oxide used according to an embodiment of the present invention synthesized by sol-gel techniques.

As disclosed above, the invention is a method for treating exhaust gas containing carbon monoxide, hydrocarbons, and nitrogen oxides generated by a lean-burn internal combustion engine. The method comprises the step of: bringing the exhaust gas from a lean-burn engine in contact with a particular alumina-based metal oxide material made by sol-gel techniques preferably from alkoxides. For the invention NOx absorption method, the metal oxide material would include precious metal which would either be deposited on the metal oxide or included with the components during sol-gel processing. Under lean-burn conditions, where the exhaust gas contains more oxygen than is required for oxidizing components to be oxidized in the exhaust gas, nitrogen oxides are absorbed on the metal oxide material and when the oxygen concentration in said gas is lowered the absorbed nitrogen oxides are desorbed from the metal oxide and reduced over the precious metal.

The alumina-based metal oxide used in the present invention NOx absorbing method, according to one embodiment, is an oxide based on metals consisting essentially of: (I) aluminum, (II) at least one of the group: (a) alkali metals, (b) alkaline earth metals (meaning including a mixture of them) and (III) optionally, a lanthanum metal. More preferably, the alumina-based metal oxide is a single phase metal-alumina material made according to sol-gel techniques from particular heterometallic alkoxides as will be described in detail below. The metal oxide materials are useful as catalyst supports for treating engine exhaust gases.

The alumina-based metal oxide used according to the present invention method can be made from any sol-solution mixture of precursors which will result in the above described oxide. That is, the precursor materials contain (I) alumina, (II) at least one of the group consisting of: alkali metal, alkaline earth metal, and their mixture, and optionally (III) lanthanide oxide. Numerous suitable precursor materials would be apparent to one skilled in the art in view of the present disclosure. For example, the oxide may be made from metal salts such as halides, nitrates, alkoxides, the latter being preferred and represented by formula $M(OR)_n$, wherein R represents preferably a lower alkyl group, M represents a metal element selected from the group consisting of aluminum, alkali metal, alkaline earth metal and lanthanides, n being the valence of M. By lower alkyl group is meant $C_1$ to $C_6$. In the case of nitrates or halides of the alkali metal, alkaline earth and aluminum, and lanthanides, it may be made by hydrolysis and subsequent peptization as is well known in the art of sol-gel coatings.

The preferred alumina-based metal oxide forming materials include alkoxides of aluminum such as its methoxide, ethoxide, propoxide (n- and iso-), and butoxides (n-, sec-, and tert-); alkali metal alkoxides such as methoxide, ethoxide, propoxide (n- and iso-), and butoxides (n-, sec-, and tert-); alkaline earth metal alkoxides such as methoxide, ethoxide, propoxide (n- and iso-), and butoxides (n-, sec-, and tert-); and lanthanide alkoxides such as methoxide, ethoxide, propoxide (n- and iso-), and butoxides (n-, sec-, and tert-). Still others will be apparent to those skilled in the art in view of the present invention. The alumina-based metal oxide product preferably contains the following weight percents of these components, based on a total of 100 weight percent. That is, (a) aluminum oxide and (b) the total of alkali metal oxide and/or alkaline earth metal oxide, are preferably included in weight percents respectively of (a) 20–80 wt % and (b) 80–20 wt. %. When lanthanum oxide is present, it is included in 10–50 wt. % (based on a total of 100 wt. % of these three oxides in the product). More preferably, in the product oxide, these weight percents are 87–40 wt. %, 3—30 wt. %, and 10–30 wt. % of these three oxides, respectively.

We have found that the use of alumina-based oxides made by sol-gel techniques as NOx absorbents provides several improvements over conventional materials made with alkali metal or alkaline earth metals loaded on alumina supports. In one aspect, the sol-gel processed materials are more resistant to sulfur poisoning. We believe this is because the sol-gel process offers a better distribution of alkali metals, alkaline earths, and lanthanides in alumina than impregnation methods. Thus, the particle size of the oxides of alkali metals, alkaline earths and lanthanides remains small compared to impregnation method. This provides a larger number of reaction sites for the reaction of sulfur and nitrogen with the oxides. In another aspect they are more stable to temperature cycling as occurs during engine operation because, we believe, a better distribution of alkali metals, alkaline earths, and lanthanides in alumina slows down the sintering of the NOx trap formulation. Sintering involves thermally induced migration and coalescence of the noble metal particles which causes a decrease in surface to volume ratio leaving fewer catalytic atoms or molecules on the surface of the crystal available to the reactants. Further, because the product is made by sol-gel techniques the final product comprises oxides which are joined by chemical bonds to one other in the alumina matrix. We believe this leads to the formation of high surface area alumina materials with the metals, e.g., alkaline earth or lanthanide bonded to aluminum through oxygen. This prevents collapse of the pores in alumina with the formation of aluminum-oxygen-aluminum bonds since aluminum hydroxy bonds on the surface have been replaced with bonds with alkaline earths or lanthanides. However, neither the validity nor understanding of the theories discussed above are necessary for the practice of the invention.

The technique of making the sol-solutions is well known to those skilled in the art. In the case of using alkoxides, it generally involves (1) hydrolysis of metal alkoxides in water and/or parent alcohol (acid or base can be used as catalyst if desired) or (2) modification of metal alkoxides with organics such as acetyl-acetone and subsequent hydrolysis or (3) direct hydrolysis in water and peptization in the presence of acid. Additional discussions of sol-gel techniques as apply to the present invention will be presented further below with particular respect to the preferred alkoxides for use in the present invention NOx absorption method.

Preferably, as disclosed above, the alumina-based metal oxides used in the present invention absorption method are single phase metal-alumina materials. For example they include the single phase metal alumina materials disclosed in U.S. Pat. No. 5,403,807, the disclosure of which is hereby expressly incorporated by reference for its teachings. These materials include aluminum matrix materials made from alkoxides which include heterometallic alkoxides, in particular being aluminum/alkaline earth alkoxides and, optionally, aluminum/lanthanide alkoxides as disclosed in detail therein.

Yet other novel single-phase metal-alumina materials are preferably used as the alumina-based metal oxide material of the invention NOx absorbing method. These are single phase materials made from alkoxides including certain heterometallic alkoxides as is claimed in the above named related application Ser. No. 09/44,269. U.S. Pat. No. 6,153,555. These heterometallic alkoxides are selected from the group consisting of: (a) alkali metal (M') and aluminum (Al) heterometallic alkoxides; (b) the combination of (i) alkali metal (M') and aluminum (Al) heterometallic alkoxides with (ii) alkaline earth (M) and aluminum (Al) heterometallic alkoxides, and optionally either including (c) lanthanide (Ln) and aluminum (Al) heterometallic alkoxides. As disclosed above, these materials are preferably used as the NOx absorbing materials in oxidizing exhaust gases. They are also particularly useful in other high temperature application as catalyst supports.

The heterometallic alkoxides disclosed above to make the novel materials are, in detail, the following alkoxides listed with their general chemical formulas. The alkali metal-aluminum heterometallic alkoxide is [bis(2-propanolato)aluminum-bis (-$\mu$g-propanolato)]-alkali metal represented by the general chemical formula M'Al(OPr$^i$)$_4$, M' being an alkali metal. When isolated from reaction mixtures, these alkoxides are polymeric solids with associated solvent molecules e.g [(Pr$^i$OH)$_2$K($\mu$-OPr$^i$)$_2$Al ($\mu$-OPr$^i$)$_2$]$_n$. The alkaline earth-aluminum hetero-metallic alkoxide is bis[bis(2-propanolato)aluminum)-tetrakis ($\mu$-(2-propanolato)]-alkaline-earth metal represented by the general chemical formula M[Al(OPr$^i$)$_4$]$_2$, M being an alkaline earth metal. The lanthanide-aluminum hetero-metallic alkoxide is tris [(bis(2-propanolato) (aluminum)-hexakis-($\mu$-(2-propanolato)]lanthanide represented by the general chemical formula Ln[Al(OPr$^i$)$_4$]$_3$, Ln being a lanthanide. Alkali metal is meant to include such metals as lithium (Li), sodium (Na), potassium (K), rubidium (Rb), and cesium (Cs). Alkaline earth metal is meant to include such metals as magnesium (Mg), calcium (Ca), strontium (Sr), and barium (Ba). Lanthanide is meant to include members of the lanthanide series of the Periodic Table such as lanthanum (La) and cerium (Ce). As would be apparent to one skilled in the art in view of the present disclosure, more than one such heterometallic alkoxide could be employed. That is, e.g., alkali metal-aluminum heterometallic alkoxides such as both lithium and sodium alkoxides could be employed.

Advantageously, we believe that these preferred materials made from the heterometallic alkoxides disclosed herein are even more desirable for use as NOx absorbents. In these materials, the metals like alkali metal and lanthanide are seen to be uniformly distributed throughout the alumina matrix of the single-phase material and chemically linked into the alumina by bridges such as metal-oxygen-aluminum or metal-hydroxide-aluminum. Also these single phase material from heterometallic alkoxides have a higher surface area than materials conventionally made from mixtures of oxides like aluminum oxide, alkali metal oxide, and optionally lanthanum oxide or their precursors, e.g., nitrates, chlorides, etc. This increased surface area is advantageous, e.g., when the material is employed for catalysis. More specifically, the special advantages for NOx absorption of using heterometallic alkoxides is believed by the inventors to be the result of the molecular distribution of alkali metals, alkaline earths and lanthanides in an alumina matrix leading to single phase materials. Such distribution further improves the thermal stability of sol-gel processed materials as compared with those prepared from a mixture of mono-metallic-alkoxides.

In its broadest embodiment, the product single-phase metal-alumina materials are made by reacting water and alkoxides including the particular heterometallic alkoxides disclosed above. This general method of sol-gel technology is discussed in detail in U.S. Pat. No. 5,403,807 which may also be used for manufacturing the novel materials disclosed above. For example, a potassium-aluminum-oxide material used preferably for NOx absorption according to the present invention can be made from alkoxides including [(bis(2-propanolato)-aluminumbis($\mu$-(2-propanolato) potassium, KAl(OPr$^i$)$_4$. The ratio of alkali metals, alkaline-earth metals and/or lanthanide to alumina can be changed by including varying amounts of one or more of aluminum alkoxide, alkaline earth alkoxides, alkali metal alkoxides, and lanthanide alkoxides with the heterometallic alkoxide. Thus the ratio of, e.g., K to alumina is changed, according to the above example, by mixing Al(OPr$^i$)$_3$ with KAl(OPr$^i$)$_4$. A potassium lanthanum-alumina, e.g., may be prepared from KAl(OPr$^i$)$_4$, and La[Al(OPr$^i$)$_4$]$_3$, and optionally Al(OPr$^i$)$_3$.

Sol-gel technology is widely known and most commonly comprises reacting water and an alkoxide having hydrolyzable alkoxy groups. Any such technology may be used to make the preferred materials. Preferred sol-gel methods for making the novel single phase metal alumina materials according to the present invention are detailed below. Still others considered within the scope of the invention will be apparent to those skilled in the art in view of the present disclosure.

In one embodiment of the present invention, a single-phase metal-alumina materials, e.g., an alkali metal-aluminum oxide material, is formed from a heterometallic alkoxide including the steps of forming a reaction mixture from M'[Al(OPr$^i$)$_4$], M'=Li, Na, K, and water, maintaining the reaction mixture at elevated temperature, removing isopropanol and water from the reaction mixture, and collecting the xerogel. According to another embodiment of the present invention, an alkali metal-alkaline earth-aluminum oxide material is formed from heterometallic alkoxides including the steps of forming a reaction mixture from M'[Al(OPr$^i$)$_4$], M'=Li, Na, K, Rb, Cs; M[Al(OPr$^i$)$_4$]$_2$, M=Mg, Ca, Ba, Sr; and water, maintaining the reaction mixture at elevated temperature, removing isopropanol and water from the reaction mixture, and collecting the xerogel. According to yet another embodiment, either of above embodiments may be modified by including a lanthanide hetero-metallic alkoxide (Ln[Al(OPr$^i$)$_4$]$_3$, Ln=La, Ce) during sol-gel preparation. The steps of sol-gel processing may me modified as would be apparent to those skilled in the art in view of the present disclosure, while still obtaining the single-phase metal-aluminum materials disclosed herein.

The alumina-based metal oxide, as well as the preferred single-phase metal-alumina materials, may include minor proportions of other materials to stabilize or otherwise enhance the oxide properties. Stabilizer materials such as silica commonly included in oxide materials to be used at elevated temperatures would also be useful herein. When included they would be used in an amount up to about 10 wt. % based on the total weight of the alumina-based metal oxide.

For use in absorbing NOx as disclosed above, the alumina-based metal oxide material, which is preferably the single-phase metal-alumina material as discussed above, would include a precious metal like platinum, palladium, or rhodium or a mixture of any of them. The precious metal can be loaded on the oxide material or incorporated within the sol-gel material during processing. For example, incipient wetness techniques may be used where the oxide material can be contacted with, e.g., hexachloroplatinic acid solution to deposit platinum. The impregnated product would be dried and calcined generally before use. Alternately, the platinum could be included in the sol as, e.g., platinum 2-ethyl hexanoate. In this case, rather than the platinum being merely loaded on the metal oxide it would be included within the metal oxide.

The precious metal included in the alumina-based metal oxide incorporated in an amount of at least 0.1 wt. % based on the total weight of the alumina-based metal oxide. Preferably, the precious metal is employed in an amount of 0.1 to 5 wt. % based on the weight of the oxide, more preferably being included in about 1 to 2 wt. %. For wet impregnation, as one example, the precious metal may be provided from soluble precious metal compounds. Water soluble compounds are preferred, including, but not limited to nitrate salts. In addition to this incorporation from a liquid phase, the precious metal, e.g., platinum, may be provided by sublimation of platinum chloride or other volatile platinum salts: by solid state exchange in the 300–500° C. temperature range using labile platinum compounds. Platinum is the preferred precious metal, however, when platinum is included other precious metal like rhodium in relatively small amounts is desirably also added, optimally as 1–5 wt. % rhodium based on the weight of the support. Rhodium is desirably included since it provides a broadening of the NOx conversion window due to increased conversion efficiency of nitrogen oxides at higher temperatures.

For useful application as an absorbent material in an exhaust system, a coating of this absorbent material will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the absorbent/catalyst of this invention. It is preferred that the surface area of the monolithic structure provide 50–100 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the metal oxide material (without the precious metal) may be applied to the substrate and then impregnated with the precursor precious metal solution. Alternately, the oxide material with precious metal may be washcoated onto the substrate by forming a slurry thereof. Generally, the oxide is provided first on the substrate and then impregnated with a precious metal precursor. Still other ways of providing the invention absorbent product will be apparent to those skilled in the art in view of the present disclosure, the method not being critical to the present invention. Generally, for use in an exhaust system this impregnated washcoat is subjected to elevated temperatures to decompose and eliminate the functional group of the precious metal precursor. It may be further subjected to calcining. Optimally, the substrate carries a washcoat of the final absorbent material in an amount of between about 20% and 40% by weight based on the weight of the substrate (e.g., monolith).

When the absorbent is placed in use, oxygen present in the exhaust gas will oxidize the precious metal like platinum to platinum oxide which at high temperatures decomposes to platinum and oxygen. Thus it often exists as a mixture of platinum and its oxides.

The method of absorbing NOx according to the present invention may be comprised of the step of placing another catalyst device as, for example, a catalytic converter employing a conventional three-way catalyst containing palladium, etc., or a lean-burn catalyst such as one containing transition metals like silver, copper, etc. in the exhaust gas passage. The three-way catalyst, for example, can be placed upstream of the NOx trap, hence closer to the engine. In such an arrangement, the three-way catalyst being preferably closely mounted to the engine would warm up quickly and provide for efficient engine cold start emission control. The NOx absorbent would be positioned downstream of the three-way catalyst where the lower exhaust gas temperature enables maximum NOx absorption efficiency. The lean-burn catalyst, if employed may be placed before or after the lean burn NOx trap depending on the NOx removal strategy.

As discussed above, during periods of lean-burn engine operation when NOx passes through the three-way catalyst, NOx is stored on the absorbent. The NOx absorbent is periodically regenerated by short periods or intervals of slightly rich engine operation. Thus, the stored NOx is then released (purged) from the trapping material and is catalytically reduced over a precious metal like platinum in the absorbent material by the excess hydrocarbons and other reductants like CO and $H_2$ present in the exhaust gas. In general, the released NOx is efficiently converted to $N_2$ and $CO_2$ which efficiency is enhanced when rhodium is contained within the NOx absorbent washcoat. However, one may wish to place a second three way catalyst downstream of the NOx absorbent in order to further aid in this regard. As disclosed above, the invention NOx absorbent is to be used for gasoline engines where during lean-burn operation the air/fuel ratio is usually in the range 19–27. In addition, the invention NOx absorbent may be used for diesel engines which also operate in lean-burn conditions. In order to provide the more reducing atmosphere, materials like urea and hydrocarbons, as from diesel fuel, may be injected into the absorbent or into the absorbent stream entering the absorbent to provide for the regeneration of the absorbent.

Examples 1–4 are examples of embodiments of the present invention for NOx absorption using alumina-based metal oxides. The remaining examples are directed to the use of preferred single-phase metal-alumina materials.

EXAMPLE 1

Tetrahydrofuran (60 mL) is added to a mixture of $LiOPr^i$ (0.07 g) and $Al(OPr^i)_3$ (10 g). A suspension is obtained. The suspension is added to water (60 ml) at 80° C. with stirring. Immediate hydrolysis occurs and a gel is formed. The volatiles are evaporated at 90° C. and the resulting powder is pyrolyzed at 400° C.

EXAMPLE 2

Isopropanol (60 mL) is added to a mixture of $NaOPr^i$ (0.43 g) and $Al(OPr^i)_3$ (10.8 g). The solution is added to water (60 ml) at 80° C. with stirring. Immediate hydrolysis occurs and a gel is formed. The volatiles are evaporated at 90° C. and the resulting powder is pyrolyzed at 400° C. The BET surface area of powder is 263 $m^2$/g and the NOx trap efficiency is 82% at 310° C. as shown in FIG. 1.

EXAMPLE 3

Isopropanol 60 mL) is added to a mixture of $KOPr^i$ (0.48 g) and $Al(OPr^i)_3$ (10 g). The solution is added to water (60 ml) at 80° C. with stirring. Immediate hydrolysis occurs and a gel is formed. The volatiles are evaporated at 90° C. and the resulting powder is pyrolyzed at 400° C.

EXAMPLE 4

Figure 2:
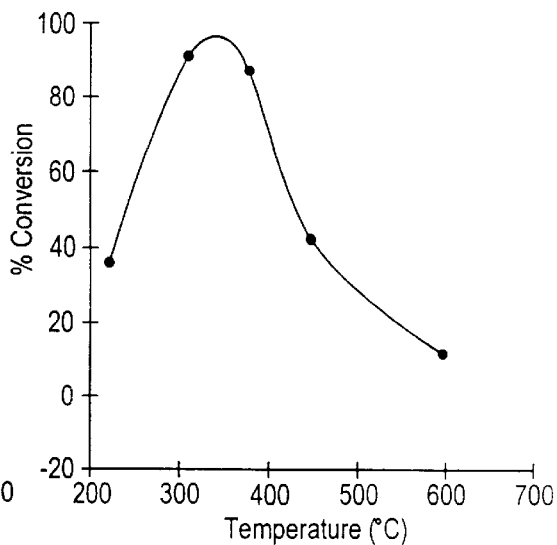
FIG. 2 is a graph showing the lean NOx trapping efficiency of an oxide used according to an embodiment of the present invention synthesized by sol-gel techniques.

An alkoxide mixture of $Ba(OPri)_2$ (1.05 g) and $Al(OiPr)_3$ (10.05 g) in 2-propanol is added to 200 ml water at 80° C. with stirring. The volatiles are removed at 90° C. The resulting powder is collected and pyrolyzed at 400° C. The BET surface area of powder is 252 $m^2$/g and the NOx trap efficiency is 92% at 310° C. as shown in FIG. 2.

EXAMPLE 5

Figure 3:
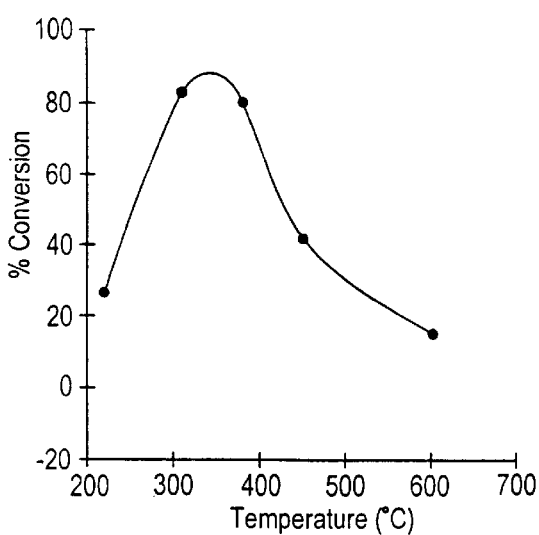
FIG. 3 is a graph showing the lean NOx trapping efficiency of an oxide according to an embodiment of the present invention synthesized by the sol-gel method.

An alkoxide mixture of, $NaAl(OPri)_4$, (1.52 g) and $Al(OiPr)_3$ (9.73 g)in tetrahydrofuran (THF) is added to 200 ml water at 80° C. with stirring. The volatiles are removed at 90° C. The resulting powder is collected and pyrolyzed at 400° C. The BET surface area of powder is 263 $m^2$/g and the NOx trap efficiency is 82% at 310° C. as shown in FIG. 3.

EXAMPLE 6

Figure 4:
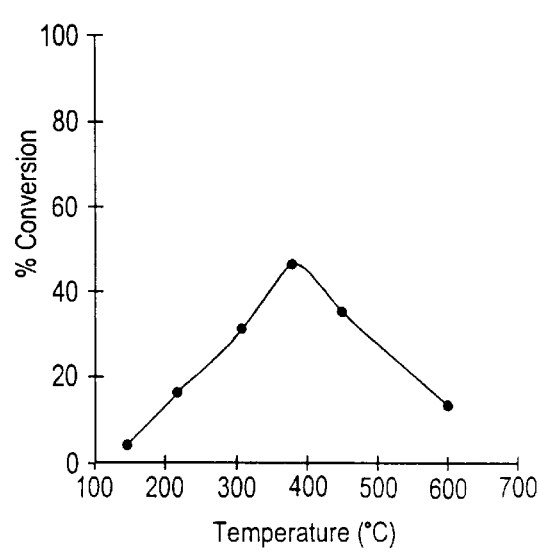
FIG. 4 is a graph showing the lean NOx trapping efficiency of an oxide according to an embodiment of the present invention synthesized by the sol-gel method.

An alkoxide mixture of $LiAl(OPr^i)_4$, (1.81 g), $Ba[Al(OPr^i)_4]_3$ (0.43 g) $Al(OPr^i)_3$ (1.57 g) in tetrahydrofuran (THF) is added to 200 ml water at 80° C. with stirring. The volatiles are removed at 90° C. The resulting powder is collected and pyrolyzed at 600° C. The BET surface area of powder is 78.3 $m^2$/g and the NOx trap efficiency is 47% at 380° C. as shown in FIG. 4.

EXAMPLE 7

Figure 7:
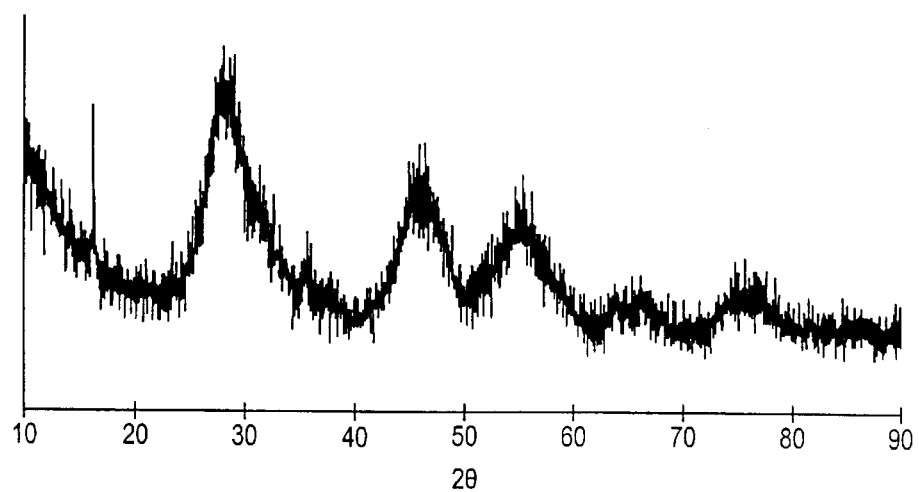
FIG. 7 is the X-ray Diffraction of a present invention embodiment single phase metal oxide synthesized by the sol-gel method.

An alkoxide mixture of Li(OPri) (1.06 g), $LiAl(OPri)_4$ (1.08 g), $La[Al(OPri)_4]_3$ (3.72 g), and $Ce[Al(OPri)_4]_3$ (3.72 g) in tetrahydrofuran (THF) is added to 200 ml water at 80° C. with stirring. The volatiles are removed at 90° C. The resulting powder is collected and pyrolyzed at 400° C. The BET surface area of the powder is 174 $m^2$/g and the NOx trap efficiency is 70% at 380° C. FIG. 7 shows X-ray diffraction data of this material and shows that the lithium, lanthanum and aluminum oxides are amorphous.

Figure 5:
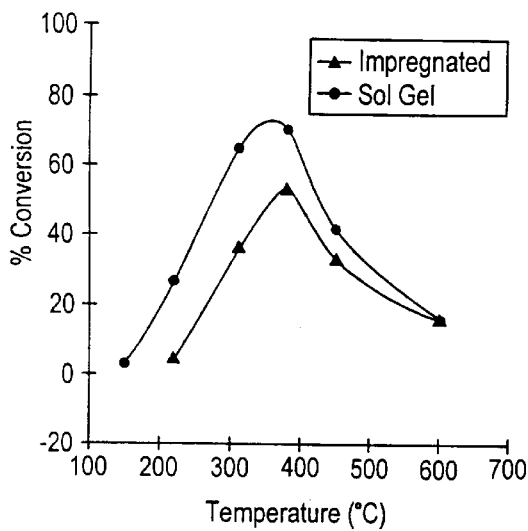
FIG. 5 is a graph showing the comparison of lean NOx trapping efficiency of a present invention embodiment oxide synthesized by the sol gel method and an oxide not according to this invention.

A comparative example, i.e., not according to this invention, is made by suspending commercial γ-alumina (1.43 g) in water and adding a solution of lithium nitrate (1.38 g), lanthanum nitrate hexahydrate (1.73 g) and cerium nitrate hexahydrate (1.74 g) to this suspension, drying and pyrolyzing. This material is not made by sol-gel process teachings. The BET surface area of the powder is 21 $m^2$/g and the NOx trap efficiency is 53% at 380° C. as shown in FIG. 5. FIG. 5 clearly shows that materials prepared according to the teachings of this invention are superior for NOx absorption.

EXAMPLE 8

Figure 6:
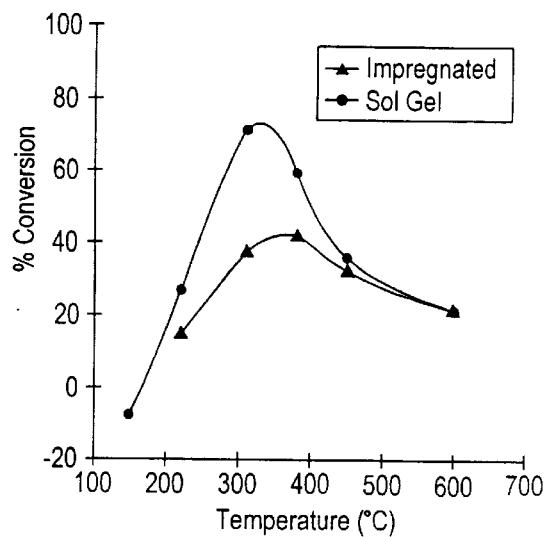
FIG. 6 is a graph showing the comparison of lean NOx trapping efficiency of a present invention embodiment oxide synthesized by the sol gel method and a comparative example oxide not according to this invention.

An alkoxide mixture of $CaAl(OPri)_4$ (2.44 g), $La[Al(OPri)_4]_3$ (4.0 g) and $Ce[Al(OPri)_4]_3$ (4.0 g) in isopropanol is cooled to −78° C. and treated with 2.48 g water in isopropanol. The volatiles are removed after warming to room temperature. The resulting powder is collected and pyrolyzed at 400° C. The BET surface area of the powder is 127 $m^2$/g and the NOx trap efficiency is 71% at 310° C. A comparative example i.e., not according to this invention, is made by suspending commercial γ-alumina (1.76 g) in water and adding a solution of calcium nitrate tetrahydrate (1.02 g), lanthanum nitrate hexahydrate (1.87 g) and cerium nitrate hexahydrate (1.87 g) to this suspension, drying and pyrolyzing. This material is not made by sol-gel process teachings. The BET surface area of the powder is 29 $m^2$/g and the NOx trap efficiency is 41% at 380° C. (FIG. 6). FIG. 6 clearly shows that materials prepared according to the teachings of the present invention are superior as NOx absorbents.

We claim:

1. A method for treating exhaust gas containing carbon monoxide, hydrocarbons, and nitrogen oxides generated by a learn-burn internal combustion engine, the method comprising the step of:

bringing said exhaust gas from said contact with an oxide material of a single phase metal-alumina made by sol-gel techniques from alkoxides which include heterometallic alkoxides further having at least 0.1 wt. % precious metal selected from the group consisting of platinum, palladium, rhodium, and a mixture of any of them provided by impregnation onto said oxide material, said oxide material being based on oxides of metals consisting essentially of (I) aluminum, (II) at least one of: i) alkali metals and ii) alkaline earth metals, and (III) optionally a lanthanide metal, wherein under lean-burn conditions, where said exhaust gas contains more oxygen than is required for oxidizing components to be oxidized in the exhaust gas, nitrogen oxides are absorbed on said oxide material, and lowering the oxygen concentration of said gas when the absorbed nitrogen oxides are to be desorbed and reduced over said precious metal.

2. The method according to claim 1 wherein said alumina-based metal oxide includes 20–80 wt. % aluminum oxides and 80–20 wt. % of the total of alkali metal oxides and alkaline earth metal oxides.

3. The method according to claim 2 wherein said alumina-based metal oxide includes 10–50 wt. % oxides of a lanthanide.

4. The method according to claim 1 wherein said alkali metal is selected from the group consisting of lithium, potassium, sodium, cesium, and a mixture of any of them.

5. The method according to claim 1 wherein said alkaline earth metal is selected from the group consisting of calcium, barium, strontium, magnesium, and a mixture of any of them.

6. The method according to claim 1 wherein said lanthanide is selected from the group consisting of lanthanum, cerium, and their mixture.

7. The method according to claim 1 wherein said precious metal is present in an amount of 1–5 wt. % based on the weight of the oxide.

8. The method according to claim 1 which further comprises placing a three-way catalyst either upstream or downstream of the alumina-based metal oxide.

9. The method according to claim 1 wherein said alumina-based metal oxide is a single phase metal-alumina material made according to sol-gel techniques from alkoxides including heterometallic alkoxide consisting of at least one of: (i) [bis(2-propanolato)-aluminumbis-(-$\mu$(2-propanolato)]alkali metals and (ii) bis[(bis(2-propanolato)-aluminum)tetrakis-($\mu$-(2-propanolato))]alkaline earth and, optionally, (iii) tris[(bis(2-propanolato)-aluminum)hexakis-($\mu$-(2-propanolato))]lanthanides.

* * * * *